United States Patent
Negrin et al.

(10) Patent No.: US 12,427,484 B2
(45) Date of Patent: Sep. 30, 2025

(54) DEVICE AND METHOD FOR WATER FILTRATION USING DISCARDED DIALYZERS

(71) Applicant: Nufiltration Ltd., Caesarea (IL)

(72) Inventors: Giacomo Negrin, Caesarea (IL); Yehoshua Amrami, Ramat-HaKovesh (IL)

(73) Assignee: Nufiltration Ltd., Caesarea (IL)

( * ) Notice: Subject to any disclaimer, the term of this patent is extended or adjusted under 35 U.S.C. 154(b) by 972 days.

(21) Appl. No.: 16/339,396

(22) PCT Filed: Sep. 29, 2017

(86) PCT No.: PCT/IL2017/051104
§ 371 (c)(1),
(2) Date: Apr. 4, 2019

(87) PCT Pub. No.: WO2018/065979
PCT Pub. Date: Apr. 12, 2018

(65) Prior Publication Data
US 2020/0038812 A1    Feb. 6, 2020

Related U.S. Application Data

(60) Provisional application No. 62/404,257, filed on Oct. 5, 2016.

(51) Int. Cl.
*B01D 61/24* (2006.01)
*B01D 61/28* (2006.01)
(Continued)

(52) U.S. Cl.
CPC .......... *B01D 65/02* (2013.01); *B01D 61/243* (2013.01); *B01D 61/28* (2013.01); *C02F 1/44* (2013.01);
(Continued)

(58) Field of Classification Search
None
See application file for complete search history.

(56) References Cited

U.S. PATENT DOCUMENTS 4,707,335 A   11/1987   Fentress et al.
4,923,226 A    5/1990   Bartholomew
(Continued)

FOREIGN PATENT DOCUMENTS

EP   1488826   12/2004
FR   2957272    9/2011
(Continued)

OTHER PUBLICATIONS

Notice of Reason(s) for Rejection Dated Jun. 22, 2021 From the Japan Patent Office Re. Application No. 2014-513308 and Its Translation Into English.(8 Pages).
(Continued)

*Primary Examiner* — Hayden Brewster (57) ABSTRACT

A connector for connecting a dialyzer to a hole in a side wall of a water pipe, the connector including a connector body including a cavity crossing the connector body from a first end of the connector body to a second end, for enabling water flow from the first end to the second end, wherein the cavity at the first end is shaped and sized for pressing onto a port of a dialyzer, and the cavity at the second end is shaped and sized for pressing into a hole in a side wall of a water pipe. In a water filtration system including dialyzers for water filtration, a method of cleaning a dialyzer including providing clean water from a clean water output of one first dialyzer to a clean water output of one second dialyzer, to backwash the second dialyzer. Related apparatus and methods are also described.

20 Claims, 8 Drawing Sheets

(51) Int. Cl.
  *B01D 65/02* (2006.01)
  *C02F 1/44* (2023.01)
(52) U.S. Cl.
  CPC .... *B01D 2313/131* (2022.08); *B01D 2313/44* (2013.01); *B01D 2317/04* (2013.01); *B01D 2321/04* (2013.01); *B01D 2321/12* (2013.01); *C02F 2201/004* (2013.01); *C02F 2303/16* (2013.01)

(56) References Cited

U.S. PATENT DOCUMENTS

| 5,397,468 | A | 3/1995 | Chomka et al. | |
| 2009/0227954 | A1* | 9/2009 | Loiterman | F16L 33/227 |
| | | | | 285/332 |
| 2011/0056894 | A1 | 3/2011 | Scheu | |
| 2012/0074060 | A1 | 3/2012 | Lass | |
| 2016/0236945 | A1* | 8/2016 | Floyd | C02F 1/003 |

FOREIGN PATENT DOCUMENTS

| JP | 2005-28122 | 2/2005 |
| WO | WO 2007/049053 | 5/2007 |
| WO | WO 2010/143184 | 12/2010 |
| WO | WO 2013/094533 | 6/2013 |
| WO | WO 2018/065979 | 4/2018 |

OTHER PUBLICATIONS

Office Action Dated Feb. 21, 2022 From the Israel Patent Office Re. Application No. 265852. (4 Pages).
Notice of Preliminary Rejection Dated Jan. 18, 2022 From the Korean Intellectual Property Office Re. Application No. 10-2019-7012872 and Its Translation Into English. (12 Pages).
Examination Report Dated Jul. 13, 2021 From the Servico Publico Federal, Ministerio da Economia, Instituto Nacional da Propriedade Industrial do Brasil RE Application No. BR1120190006980 1 and its English Translation. (15 Pages).
International Preliminary Report on Patentability Dated Apr. 18, 2019 From the International Bureau of WIPO Re. Application No. PCT/IL2017/051104. (12 Pages).
International Search Report and the Written Opinion Dated Feb. 26, 2018 From the International Searching Authority Re. Application No. PCT/IL2017/051104. (20 Pages).
Invitation to Pay Additional Fees and Communication Relating to the Results of the Partial International Search Dated Jan. 3, 2018 From the International Searching Authority Re. Application No. PCT/IL2017/051104. (14 Pages).
Notice of Preliminary Rejection Dated Nov. 25, 2022 From the Korean Intellectual Property Office Re. Application No. 10-2019-7012872 and its Summary and Claims in English. (7 Pages).
Communication Pursuant to Article 94(3) EPC Dated Nov. 18, 2022 From the European Patent Office Re. Application No. 17785032.8. (5 pages).
Relatório de Busca e Parecer [Search Report and Opinion] Dated Feb. 22, 2023 From the Serviço Público Federal, Ministério da Economia, Instituto Nacional da Propriedade Industrial do Brasil Re. Application No. BR 112019006980 1 and Its Translation Into English. (8 Pages).
Translation Dated Oct. 25, 2023 of Trial Decision in Response to the Appeal Dated Oct. 17, 2023 from the Intellectual Property Trial and Appeal Board (IPTAB) of Korea Re. Korean Application No. 10-2019-7012872. (5 Pages).
Trial Decision in Response to the Appeal Dated Oct. 17, 2023 from the Intellectual Property Trial and Appeal Board (IPTAB) of Korea Re. Korean Application No. 10-2019-7012872 and Its Short Summary in English. (18 Pages).
Communication Pursuant to Article 94(3) EPC Dated Mar. 1, 2024 From the European Patent Office Re. Application No. 17785032.8 (6 Pages).
Grounds of Reason of Rejection Dated Feb. 13, 2024 From the Korean Intellectual Property Office Re. Application No. 10-2023-7039618 (6 Pages).
Translation Dated Feb. 23, 2024 of Grounds of Reason of Rejection Dated Feb. 13, 2024 From the Korean Intellectual Property Office Re. Application No. 10-2023-7039618 (4 Pages).
Communication Pursuant to Article 94(3) EPC Dated Mar. 27, 2025 From the European Patent Office Re. Application No. 17785032.8 (5 Pages).
Grounds of Reason of Rejection Dated Feb. 10, 2025 From the Korean Intellectual Property Office Re. Application No. 10-2023-7039618 and its Translation into English. (11 Pages).

* cited by examiner

DEVICE AND METHOD FOR WATER FILTRATION USING DISCARDED DIALYZERS

RELATED APPLICATIONS

This present application claims priority from U.S. Provisional Patent Application No. 62/404,257 filed 5 Oct. 2016.

FIELD AND BACKGROUND OF THE INVENTION

The present invention, in some embodiments thereof, relates to water filtration and to reuse, in water filtration systems, of medical filters discarded from medical use, and a connection thereof to water filtration systems and, more particularly, but not exclusively, to dialyzers discarded from medical use.

Waste water, surface water, storm water, ground water and sea water are frequently contaminated with the fecal material of man or other animals. *Cryptosporidium oocysts* (protozoan infections), *E. coli* and *Vibrio cholerae* (bacterial infections), and Hepatitis A (viral infections) are but a few examples of contaminants. Water filtration and water purification are required in many situations. In addition, contaminated water may include colloidal materials, which can destroy expensive Reversed Osmosis ("RO") membranes used in water purification and particularly in desalinization. Fouling of such expensive membranes can be prevented by pretreatment of water before undergoing reversed osmosis treatment.

Ultra-filtration ("UF") can be used, for example, for production of tertiary effluent from secondary effluent in municipal waste water treatment plants, such as for "polishing" sand filter tertiary effluent and, for example, for water pretreatment in reversed osmosis applications such as the desalination of sea water and brackish water. Ultra-filtration is a separation process using filter membranes having pore sizes in the range of 0.1 micron (100 nanometer) to 0.001 micron (1 nanometer). UF membranes are used to treat surface water, storm water, ground water, seawater and waste water as either primary treatment or as pretreatment in reversed osmosis desalination plants, or other types of desalinization plants. In these and other applications, UF filters are used in water filtration to remove high molecular-weight substances, colloidal materials, organic and inorganic polymeric molecules, and pathogens.

However, UF water filters are expensive.

Large water treatment plants typically use 500-1000 UF filters at a cost of many millions of dollars (including support systems). One such filter typically costs more than a thousand dollars. For example, at retail prices current at the time of filing of this application, Applied Membrane Model M-UB8040PES 8"×40" UF PES Membrane 10,000 MWCO (Molecular Weight Cut Off) cost is $1544, without a pressure tank). A Hydranautics Hydracap UF filter sells for $2550.

Apart from UF membranes per se, water filtration apparatus requires various tubes and couplings (e.g. quick release) as used in the industry or described in publications such as U.S. Pat. No. 4,923,226, US 2009/227954, and WO 2007/049053.

Additional background art includes:

Published PCT Patent Application WO 2010/143184 of Yoram LASS.

The disclosures of all references mentioned above and throughout the present specification, as well as the disclosures of all references mentioned in those references, are hereby incorporated herein by reference.

SUMMARY OF THE INVENTION

The present invention, in some embodiments thereof, relates to water filtration and to reuse, in water filtration systems, of medical filters discarded from medical use, and a connection thereof to water filtration systems and, more particularly, but not exclusively, to dialyzers discarded from medical use.

According to an aspect of some embodiments of the present invention there is provided a system for water filtration including at least one dialyzer, a water input pipe connected to a blood port of the dialyzer, and a clean water output pipe directly connected by a first press-fit connector to a dialysate port of the dialyzer, wherein the dialysate port of the dialyzer is connected to a hole in a side wall of the output pipe.

According to some embodiments of the invention, the output pipe is directly connected by two press-fit connectors to both dialysate ports of the dialyzer.

According to some embodiments of the invention, the first press-fit connector is shaped to connect the dialysate port of the dialyzer to the hole in a side wall of the output pipe so that a tip of the dialysate port of the dialyzer is inside the hole in the side wall of the output pipe.

According to some embodiments of the invention, the first press-fit connector is shaped to connect the dialysate port of the dialyzer to the hole in a side wall of the output pipe so that a distance between a tip of the dialysate port of the dialyzer and the side wall of the output pipe is not greater than 10 millimeters.

According to some embodiments of the invention, the first press-fit connector is shaped to connect the dialysate port of the dialyzer to the hole in a side wall of the output pipe so that a distance between a tip of the dialysate port of the dialyzer and the side wall of the output pipe is not greater than 5 millimeters.

According to some embodiments of the invention, the first press-fit connector includes an internal surface at least partly shaped to conform to an outer surface of the dialysate port of the dialyzer.

According to some embodiments of the invention, the internal surface of the first press-fit connector conforms to an outer surface of the dialysate port of the dialyzer by including a groove conforming to a shape of a nipple of the dialysate port of the dialyzer.

According to some embodiments of the invention, the first press-fit connector includes an outer surface including a first tapered end, and following the first tapered end a cutout around the first press-fit connector, at least as wide as a wall of the clean water output pipe.

According to some embodiments of the invention, the water input pipe is connected to the blood port of the dialyzer by at least one second press-fit connector.

According to some embodiments of the invention, the second press-fit connector includes an internal surface at least partly shaped to conform to an outer surface of a dialysate port of the dialyzer.

According to some embodiments of the invention, the second press-fit connector includes an outer surface including a first tapered end, and following the first tapered end a cutout around the second press-fit connector, at least as wide as a wall of the clean water output pipe.

According to some embodiments of the invention, further including a second dialyzer, and at least one valve enabling connection of clean output water from the first dialyzer to a dialysate port of the second dialyzer, to backwash the second dialyzer.

According to an aspect of some embodiments of the present invention there is provided a connector for connecting a dialyzer to a hole in a side wall of a water pipe, the connector including a connector body including a cavity crossing the connector body from a first end of the connector body to a second end of the connector body, for enabling water flow from the first end to the second end, wherein the cavity at the first end of the connector body is shaped and sized for pressing onto a port of a dialyzer, and the cavity at the second end of the connector body is shaped and sized for pressing into a hole in a side wall of a water pipe.

According to some embodiments of the invention, the cavity at the first end of the connector body is shaped and sized for pressing onto a blood port of a dialyzer.

According to some embodiments of the invention, the cavity at the first end of the connector body is shaped and sized for pressing onto a dialysate fluid port of a dialyzer.

According to an aspect of some embodiments of the present invention there is provided a method for filtering water including providing a system for water filtration including at least one dialyzer, a water input pipe connected to a blood port of the dialyzer, and a clean water output pipe connected by at least one first press-fit connector to a dialysate port of the dialyzer, providing water to the water input pipe, and withdrawing clean water from the clean water output pipe, wherein the dialysate port of the dialyzer is connected to a hole in a side wall of the output pipe.

According to some embodiments of the invention, the output pipe is connected by two press-fit connectors to both dialysate ports of the dialyzer.

According to some embodiments of the invention, the first press-fit connector is shaped to connect the dialysate port of the dialyzer to a hole in a side wall of the output pipe so that a tip of the dialysate port of the dialyzer is inside the hole in the side wall of the output pipe.

According to some embodiments of the invention, the first press-fit connector includes an internal surface at least partly shaped to conform to an outer surface of the dialysate port of the dialyzer.

According to some embodiments of the invention, the water input pipe is connected to the blood port of the dialyzer by at least one second press-fit connector.

According to some embodiments of the invention, the second press-fit connector includes an internal surface at least partly shaped to conform to an outer surface of a dialysate port of the dialyzer.

According to an aspect of some embodiments of the present invention there is provided, in a water filtration system including dialyzers for water filtration, a method of cleaning a dialyzer including providing clean water from a clean water output of one first dialyzer to a clean water output of one second dialyzer, to backwash the second dialyzer.

According to some embodiments of the invention, the providing clean water from a clean water output includes providing clean water from a clean water output of a first plurality of dialyzers to a clean water output of a second plurality of dialyzers, to backwash the second plurality of dialyzers, wherein a number of dialyzers included in the first plurality of dialyzers is not greater than a number of dialyzers in the second plurality of dialyzers.

According to some embodiments of the invention, the providing clean water from a clean water output includes providing clean water from a clean water output of a first plurality of dialyzers to a clean water output of a second plurality of dialyzers, to backwash the second plurality of dialyzers, wherein a total membrane area of the first plurality of dialyzers is not greater than a total membrane area of the second plurality of dialyzers.

According to an aspect of some embodiments of the present invention there is provided a system for water filtration including a first dialyzer, a water input pipe connected to a blood port of the first dialyzer, a clean water output pipe connected to a dialysate port of the first dialyzer, a second dialyzer, a water input pipe connected to a blood port of the second dialyzer, a clean water output pipe connected to a dialysate port of the second dialyzer, and a valve for connecting clean output water from the first dialyzer to a dialysate port of the second dialyzer, to backwash the second dialyzer.

According to some embodiments of the invention, further including the clean water output pipe connected to both dialysate ports of the first dialyzer.

According to some embodiments of the invention, the first dialyzer includes a first plurality of dialyzers, the second dialyzer includes a second plurality of dialyzers, and the valve includes at least one valve, and enables connection of clean output water from the first plurality of dialyzers to dialysate ports of the second plurality of dialyzers, to backwash the second plurality of dialyzers.

According to some embodiments of the invention, a count of the dialyzers included in the first plurality of dialyzers is not greater than a count of the dialyzers included in the second plurality of According to some embodiments of the invention, a total membrane area of the dialyzers included in the first plurality of dialyzers is not greater than a total membrane area included in the second plurality of dialyzers.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to water filtration and to reuse, in water filtration systems, of medical filters discarded from medical use, and a connection thereof to water filtration systems and, more particularly, but not exclusively, to dialyzers discarded from medical use.

Overview

Above-mentioned Published PCT Patent Application WO 2010/143184 of Yoram LASS describes water filtration using recycled medical filters, or medical filters discarded from medical use for some reason.

An aspect of some embodiments of the invention involves a water filtration system which includes connecting discarded medical dialyzers closely to water pipes.

In some embodiments a connector for connecting a port of the dialyzer to a water pipe is designed to be short, and provide mechanical support, or at least some mechanical support, to hang the dialyzer on the water pipe. Such a connector potentially uses the fluid connector between the dialyzer and the water pipe also for mechanical support of the combined structure. Such a connector may also potentially provide an advantage in assembling the water filtration system, using less parts, less mechanical support parts, while achieving desired mechanical support of the dialyzer(s).

In some embodiments the water pipe may be made of a stiff material, such as, by way of a non-limiting example, metal or a stiff plastic, so as to provide mechanical support for the dialyzer.

In some embodiments the connector for connecting the port of the dialyzer to a water pipe is designed to be such that a tip of the dialyzer port is actually inside a hole in the side wall of the water pipe.

In some embodiments, such a connector may be a press-fit connector, having an inner channel designed for fluid transport and having a shape for accepting a port of the dialyzer, such as a dialysate fluid port, fit and seal into the connector by pressing the dialyzer port into the inner channel of the connector.

Such pressing of the dialyzer port into the connector potentially simplifies assembly of the water filtration system, potentially removing a need for using a tool for the assembly, and potentially removing a need for rotating the dialyzer onto the connector, or the connector onto the dialyzer, in a potentially limited space of a water filtration system.

In some embodiments, such a connector may be a press-fit connector, having an outer surface shape designed for insertion into a side wall of a water pipe, and for sealing the connector to the water pipe by pressing the connector into the side wall of a water pipe.

Such pressing of the connector into the side wall of the water pipe potentially simplifies assembly of the water filtration system, potentially removing a need for using a tool for the assembly, and potentially removing a need for rotating the connector into the hole in the water pipe, or the pipe onto the connector, in a potentially limited space of a water filtration system.

In some embodiments the connector is flexible, flexible enough to stretch over the port of the dialyzer and provide a seal between the dialyzer port and the connector.

In some embodiments the connector is flexible, flexible enough to stretch into the hole in the water pipe and provide a seal between the connector and the water pipe.

In some embodiments a distance between a tip of a port of the dialyzer, as determined by the shape of the inner channel, and the wall of the water pipe is designed to be shorter than 1, 2, 5, 10, 15 20 millimeters.

In some embodiments the connector is made of a flexible material such as plastic, and/or rubber, and/or EPDM (ethylene propylene diene monomer) rubber, and/or flexible silicone rubber.

An aspect of some embodiments of the invention involves using clean water output from one dialyzer to clean by reverse flow (backwash) through another dialyzer.

Dialyzers are constructed of capillary tube membrane where the membrane material is especially smooth, allowing a dialyzer to be cleaned with water output of another dialyzer.

In some embodiments, filtered output water of one dialyzer is used to backwash one other dialyzer.

In some embodiments, a water filtration system having two dialyzers uses filtered output water of one dialyzer to backwash one other dialyzer.

In some embodiments one or more valves are built into the water filtration system so that at one position or positions the valve(s) are set to have input water flow into inputs in the two dialyzers and produce clean filtered water output from both the dialyzers, and at other position(s) the valve(s) are set to have input water flow into an input in a first one of the dialyzers, produce clean filtered water output from the first dialyzer, and direct the clean filtered water in reverse flow through a second one of the dialyzers, backwashing the second dialyzer.

Figure 1A:
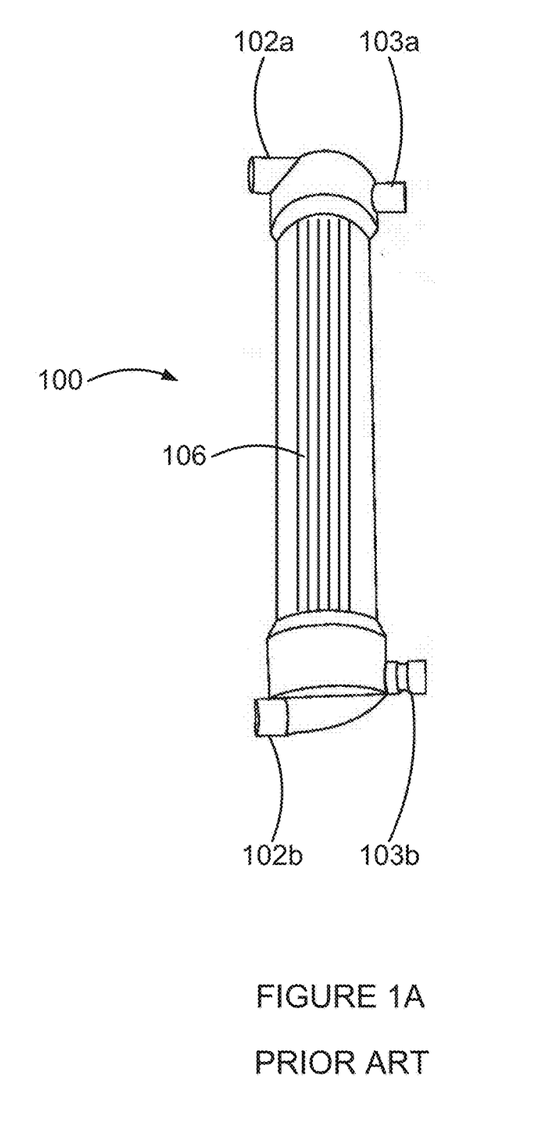
FIG. 1A is a simplified line drawing illustration of a cross section of a dialyzer according to prior art.

For purposes of better understanding some embodiments of the present invention, as illustrated in FIGS. 2-8 of the drawings, reference is first made to FIG. 1A, which is a simplified line drawing illustration of a dialyzer according to prior art.

FIG. 1A depicts a dialyzer 100, including blood input/output ports 102a 102b, and dialysate fluid input/output ports 103*a* 103*b*. FIG. 1A, being a cross section, depicts a simplified line drawing illustration of capillary membrane tubes 106.

Figure 1B:
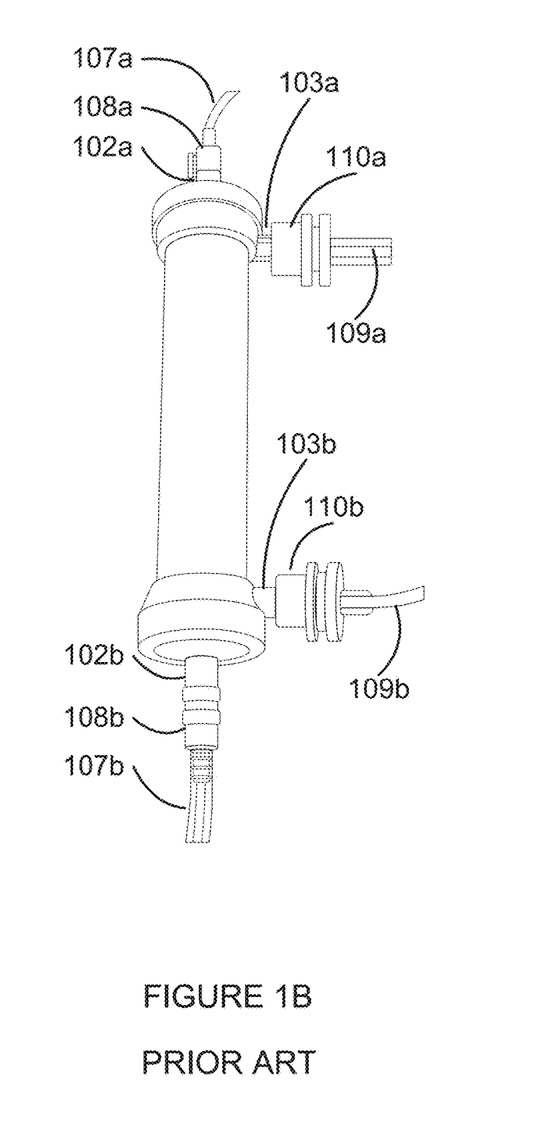
FIG. 1B is an image of a dialyzer connected to flexible tubing according to prior art.

Reference is also made to FIG. 1B, which is an image of a dialyzer connected to flexible tubing according to prior art.

FIG. 1B depicts a dialyzer 100, including blood input/output ports 102*a* 102*b*, and dialysate fluid input/output ports 103*a* 103*b*. FIG. 1B also shows blood input and output tubes 107*a* 107*b*, connected by prior art connectors 108*a* 108*b*. FIG. 1B also shows dialysate fluid input and output tubes 109*a* 109*b*, connected by prior art connectors 110*a* 110*b*.

The blood input/output ports 102*a* 102*b*, and the dialysate fluid input/output ports 103*a* 103*b* are typically of a standard size and shape. The connectors 108*a* 108*b* to the blood input/output ports 102*a* 102*b*, and the connectors 110*a* 110*b* to the dialysate fluid input/output ports 103*a* 103*b* typically connect to an end of a flexible blood tube 107*a* 107*b* and/or dialysate fluid tube 109*a* 109*b* by a clip-on connector or by a Hansen connector or by a Luer taper. The prior art connectors typically connect into the end of the flexible tubes by a plastic tip which expands the flexible tube to press on the tip.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Introduction

A dialyzer is used for medical purpose as a device to remove waste from the blood by diffusion. To that purpose the dialyzer uses a membrane filter with a membrane material and pore sizes especially suitable for such diffusion.

In some embodiments of the invention, it is realized that the membrane of a hemodialyzer is useful for filtering, and one or more dialyzers built for medical use are re-purposed and used as a filter, to filter unclean water and provide filtered water.

A dialyzer comprises two blood input/output ports, to insides of tubes of a set of capillary tube membranes, and two dialysate fluid input/output port, to outsides of tubes of the capillary tube membranes.

A dialyzer is originally designed, built, proofed and quality tested as a medical device. The dialyzer can provide absolute filtration corresponding to pore sizes of 30 nm (nanometers) and nominal filtration corresponding to pore sizes of 3.3 nm.

The dialyzer has a smooth membrane surface, relative to industrial filters, which potentially enables low fouling and makes the membrane surface easy to clean.

A dialyzer is robust—a dialyzer used experimentally as a water filter has been used for more than 3 years of continuous operation, and is still performing.

In some embodiments of the invention a dialyzer is constructed as a water filter with water input through one or two input port on one side of a hemo-dialyzer membrane, and water output from another side of the hemo-dialyzer membrane. One side of the membrane optionally provides only water output, at least during use as a water filter. In some embodiments the output side may optionally have water input when being washed. Such washing is optionally achieved by using valves and/or plugs to redirect water flow.

In some embodiments of the invention a dialyzer is constructed as a water filter with water input through one or two blood inputs, and water output through both dialysate fluid ports.

In some embodiments of the invention a dialyzer is constructed as a water filter with water input through one or two blood inputs, and water output through one dialysate fluid port, and the other dialysate fluid port is plugged shut.

In some embodiments of the invention a dialyzer may be constructed as a water filter with an advance mechanical filter for particles of approximately 200μ.

In some embodiments of the invention the dialyzer(s) may optionally be in line steam sterilized, based on the membranes being resistant to high temperature.

In some embodiments of the invention the dialyzer(s) may optionally be dialyzer(s) built to medical specifications but never packaged or never used as such.

Dialyzer availability is potentially abundant, as dialyzers are used to treat millions of patient per year.

Water filters using dialyzers as water filters potentially enable reuse of wasted elements, potentially saving disposal of medical waste.

Water filters using dialyzers as water filters potentially enable recycling polluted water:
  using no chemicals;
  potentially requiring little energy expenditure;
  potentially at low operational costs.

Figure 2:
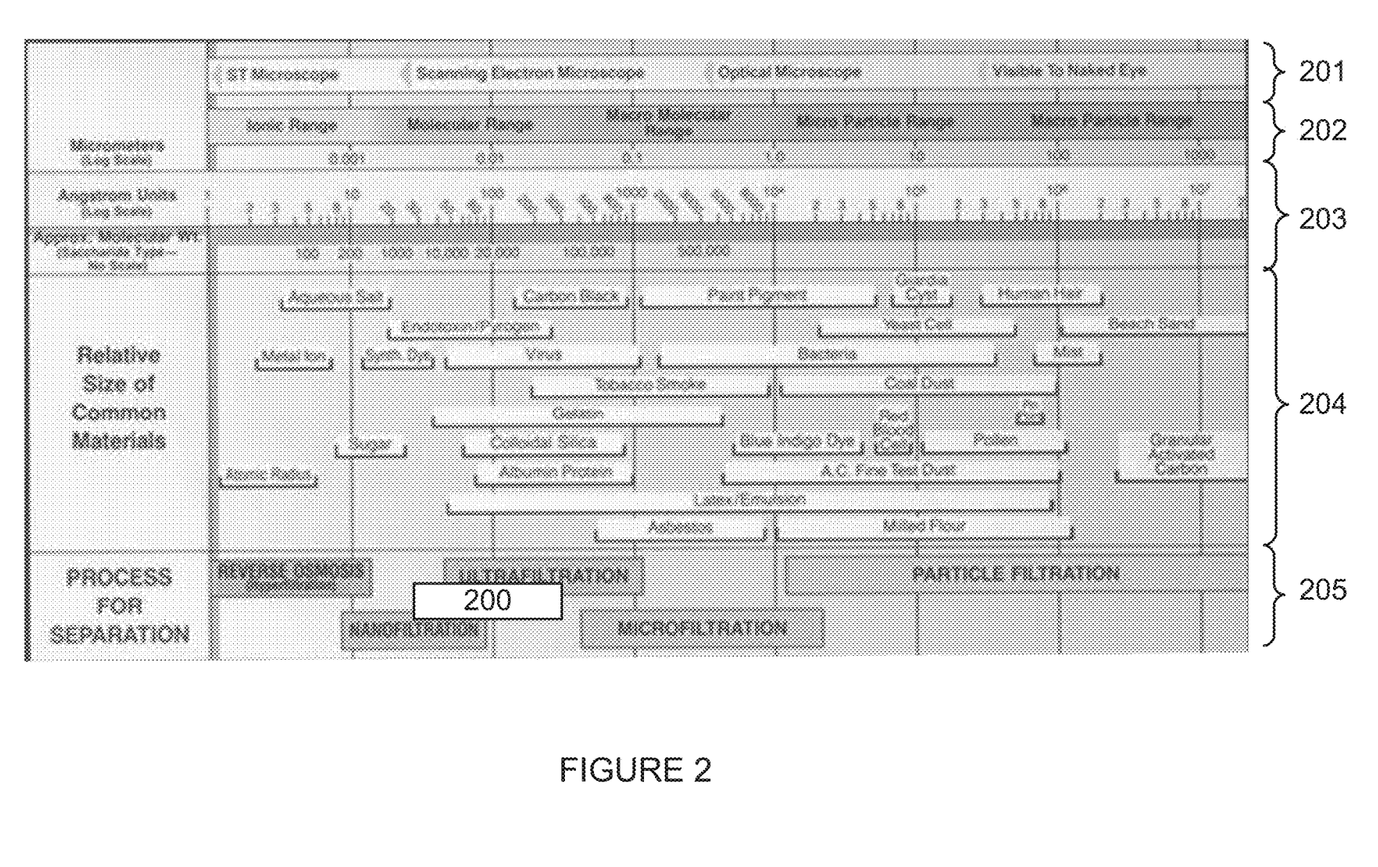
FIG. 2 is a graph showing filtration efficacy of a dialyzer, when used as a water filter according to an example embodiment of the invention, relative to various fluid purification filters.

Reference is now made to FIG. 2, which is a graph showing filtration efficacy of a dialyzer, when used as a water filter according to an example embodiment of the invention, relative to various fluid purification filters.

FIG. 2 illustrates that when the membrane material of a hemodialyzer, designed for diffusion of blood waste from the blood, is compared to conventional filters, the capabilities of a hemodialyzer, repurposed as a filter, fall in a range overlapping capabilities categorized as nano-filtration and ultra-filtration.

FIG. 2 depicts:
  a third row 203 which is a logarithmic scale of particles blocked by the various fluid purification filters;
  a first row 201 which lists how a particle of a size described in the third row 203 may be viewed or detected;
  a second row 202 which lists terms describing the size described in the third row 203;
  a fourth row 204 which lists common materials having the size described in the third row 203; and
  a fifth row 205 which lists names used for classifying filters for blocking particles having the size described in the third row 203.

A block 200 in the fifth row 205 depicts a range of sizes which a dialyzer, when used as a filter, may be used for filtering.

The position of the block 200 depicts that a dialyzer, when used as a fluid filter, provides performance at a high end of the ultra-filtration range, and into the nano-filtration range. It is noted that when dialyzers which are discarded from medical use, whether after having been used or without having been used, a water filter of excellent performance may be produced at a low cost, benefiting from low cost of an expensive product discarded from its initially intended expensive use.

A Connector for Connecting a Dialyzer to a Water Pipe

A dialyzer's input and output ports are shaped to fit connectors for connecting to an end of a flexible medical tube.

In some embodiments of the invention, a press-fit connector is provided, for connecting on a first side to a dialyzer's dialysate ports, such as ports 103a 103b depicted in FIGS. 1A and 1B, and on a second side to a wall, or side, of a water pipe.

In some embodiments, the press-fit connector is optionally made of a flexible material, capable of stretching over a dialyzer port, and into a hole in a water pipe wall, and seal the connector with the dialyzer port and the water pipe hole.

In some embodiments, polluted water is filtered from the inside of the capillary membranes to the outside of the capillary membranes, so the dialysate ports, being ports to the outer side of the capillary membrane, connect to a clean-water pipe of a water filtration system.

In some embodiments of the invention, a press-fit connector is provided, for connecting on a first side to a dialyzer's blood ports, such as ports 102a 102b depicted in FIGS. 1A and 1B, and on a second side to a water pipe.

In some embodiments, polluted water is filtered from the inside of the capillary membranes to the outside of the capillary membranes, so the blood ports, being ports to the inner side of the capillary membrane, connect to a polluted-water pipe of a water filtration system.

Figure 3:
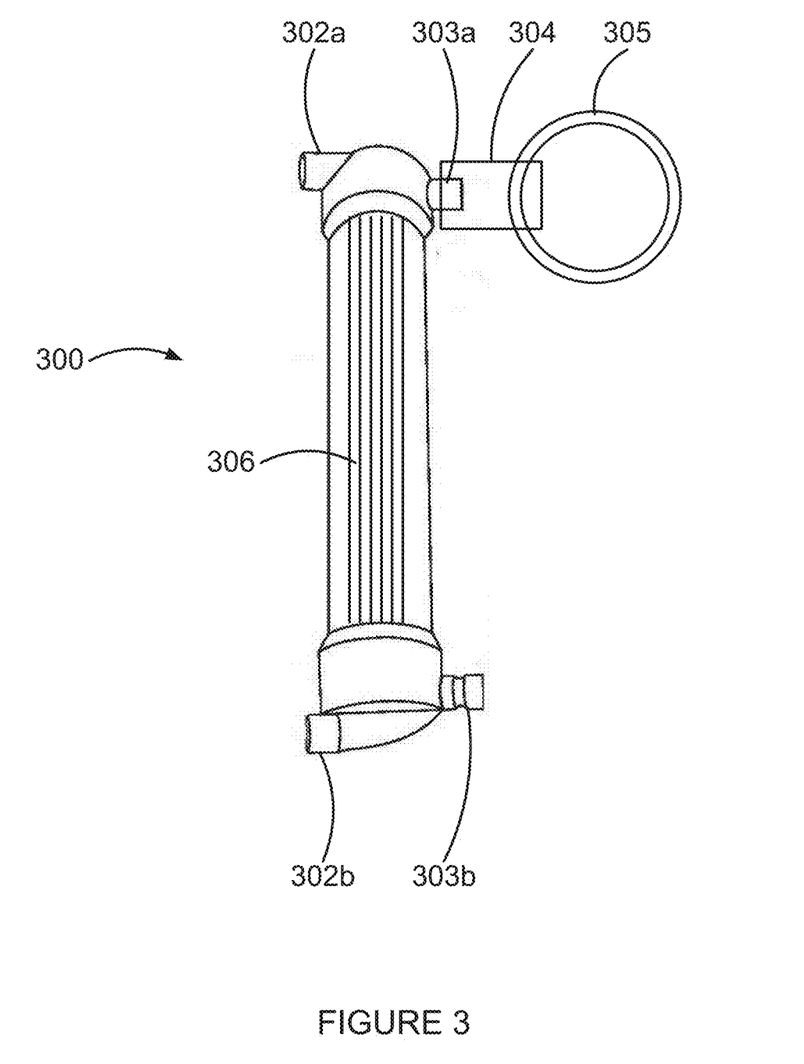
FIG. 3 is a simplified line drawing illustration of a connector connecting a dialyzer to a pipe according to an example embodiment of the invention.

In some embodiments, the press-fit connector 304 includes a through cavity for water flow from a dialyzer connector such as the dialyzer connector 303a to the water pipe 305. The press-fit connector 304 is designed to fit over the dialyzer connector such as the dialyzer connector 303a, and into a hole in a side wall of the water pipe 305. In some embodiments, the press-fit connector 304 compresses in order to press-fit into the hole in the side wall of the pipe 305.

Providing a press-fit connector, shaped to fit a dialyzer's dialysate and/or blood ports, which are shaped to fit clamping connectors for medical tubes, potentially provides one or more of the following benefits to a water filtration system using dialyzers:

providing mounting points for a dialyzer on a water pipe;
optionally lowering a number of connecting mounts of the dialyzer to a frame;
easy to install;
easy to fit (for the filters);
potentially used without o-rings or additional seals;
prevent leakages;
the connection is compact and short, approximately 5 mm to 20 mm to 80 mm;
easy removing of the filter; and
ability to withstand high pressures, from 0.2 bar up to 10 bars;

Reference is now made to FIG. 3, which is a simplified line drawing illustration of a connector 304 connecting a dialyzer 300 to a pipe 305 according to an example embodiment of the invention.

FIG. 3 depicts a dialyzer 300, including blood input/output ports 302a 302b, and dialysate fluid input/output ports 303a 303b and a simplified line drawing illustration of capillary membrane tubes 306.

FIG. 3 also depicts an example of a connector 304 connecting at least one port, in the case of FIG. 3 the dialysate fluid input/output ports 303a, to a pipe 305.

In some embodiments the connector 304 is a press-fit connector, enabling pressing the dialysate fluid input/output port 303a of the dialyzer 300 into the connector 304, and/or pressing the connector 304 into the pipe 305.

In some embodiments, the press-fit connector 304 compresses in order to press-fit into a hole in a side wall of the pipe 305.

In some embodiments, one of the dialysate fluid input/output ports 303a 303b, for example, with reference to FIG. 3, the dialysate fluid input/output port 303b, is plugged shut.

The press-fit connector 305 potentially enables several benefits relative to various other methods and devices used for connection. The benefits include some of the following:

making a mechanical attachment between the dialyzer 300 and the pipe 305, so that the dialyzer 300 and the pipe 305 potentially support one another mechanically. In some embodiments the dialyzer 300 potentially provides mechanical support to the pipe 305. In some embodiments the pipe 305 potentially provides mechanical support to the dialyzer 300; and enabling a rapid construction of a bank of dialyzers by simplifying connection between dialyzers and pipes—either input pipes, or output pipes, or both input and output pipes.

When a dialyzer is used as a filter, for example a water filter, there are at least one, and optionally two, input ports, and at least one, and optionally two, output ports.

In some embodiments the dialyzer 300, which is a capillary tube dialyzer 300, is used to filter by providing fluid from the inside of the capillaries out, so the fluid is input to the dialyzer from a blood input/output port, such as one or both of the blood input/output ports 302a 302b, and filtered fluid is collected from a dialysate fluid input/output port such as the dialysate fluid input/output ports 303a 303b.

In some embodiments the dialyzer 300, which is a capillary tube dialyzer 300, is used to filter by providing fluid from the outside of the capillaries out, so the fluid is input to the dialyzer from a dialysate fluid input/output port, such as one or both of the dialysate fluid input/output ports 303a 303b, and filtered fluid is collected from a blood input/output port such as the blood input/output ports 302a 302b.

Figure 4:
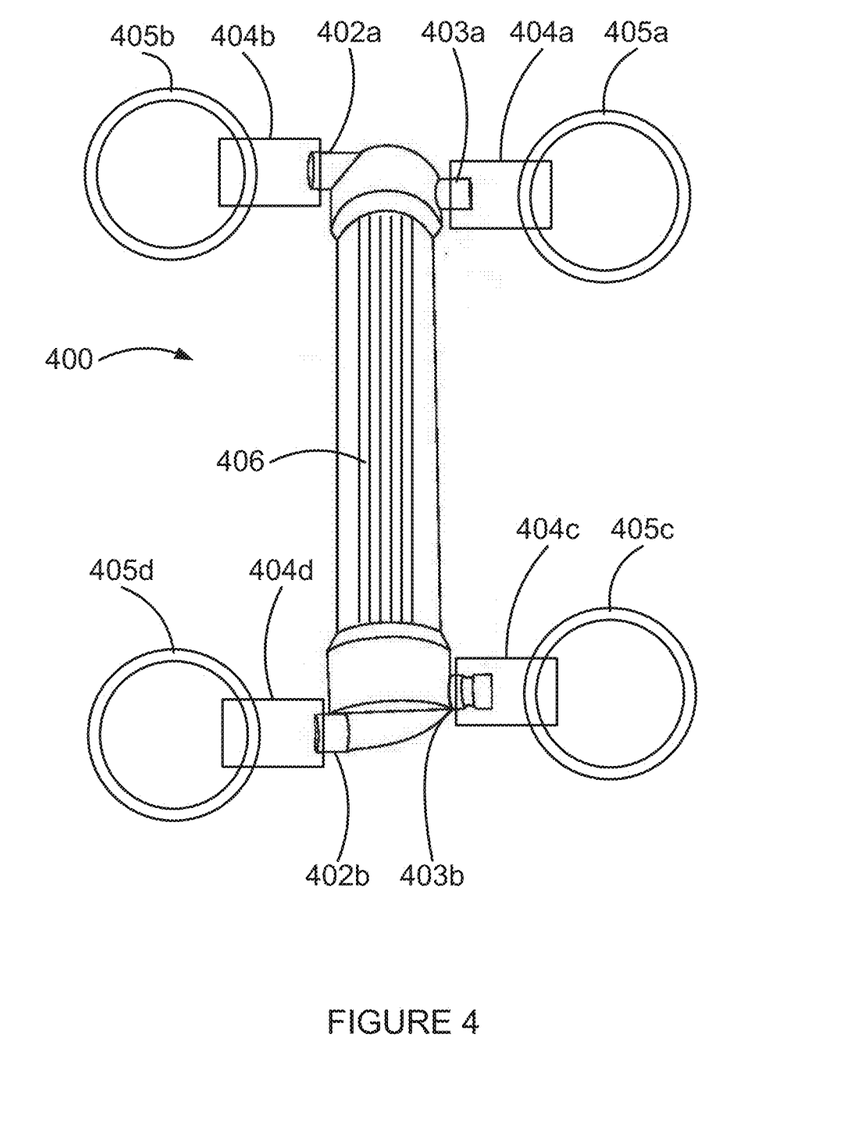
FIG. 4 is a simplified line drawing illustration of connectors connecting a dialyzer to pipes according to an example embodiment of the invention.

Reference is now made to FIG. 4, which is a simplified line drawing illustration of connectors connecting a dialyzer to pipes according to an example embodiment of the invention.

While FIG. 3 depicts a case of a single connector 304 connecting the dialyzer 300 to a pipe 305, FIG. 4 illustrates that in some embodiments any one, any two, any three or any four of the dialyzer ports may be connected to pipes by connectors.

FIG. 4 depicts a dialyzer 400, including blood input/output ports 402a 402b, and dialysate fluid input/output ports 403a 403b and a simplified line drawing illustration of capillary membrane tubes 406.

FIG. 4 also depicts examples of connectors 404a 404b 404c 404d connecting dialyzer ports to fluid input and/or output pipes 405a 405b 405c 405d.

In some embodiments one or more of the connectors 404a 404b 404c 404d may be press-fit connectors, enabling pressing the ports of the dialyzer into the connectors, and/or pressing the connectors into the pipes 405a 405b 405c 405d. The press-fit connectors 404a 404b 404c 404d potentially enable one or more of the above-mentioned benefits listed following the description of FIG. 3.

Reference is now made to FIGS. 5A-D, which are simplified line drawing illustrations of a connector connecting a dialyzer to a pipe according to an example embodiment of the invention.

Figure 5A:
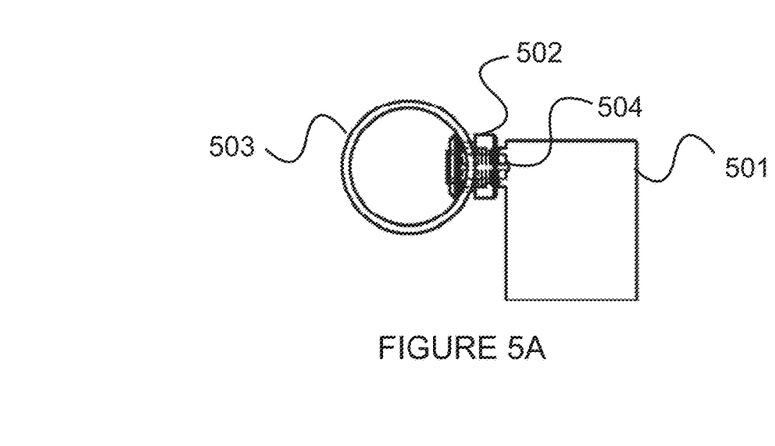
FIGS. 5A-D are simplified line drawing illustrations of a connector connecting a dialyzer to a pipe according to an example embodiment of the invention.

FIG. 5A is a side view illustration of a dialyzer 501, a press-fit connector 502 and a cross-section view of a water pipe 503. The dialyzer 501 includes a dialyzer port 504, around which the press-fit connector 502 fits, and the press-fit connector fits into a hole in the water pipe 503.

FIG. 5A depicts just a section of the dialyzer 501, in a side view. FIG. 5A depicts the water pipe 503 in a cross-section view, showing the walls of the water pipe 503. In some embodiments the cross section of the water pipe 503 is circular, as shown in FIGS. 5A-D. In some embodiments the cross section of the water pipe 503 has some other shape, such as square, rectangular or oval.

Figure 5B:
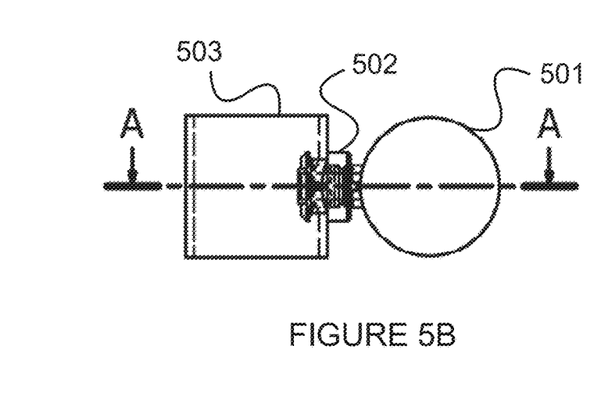

FIG. 5B is a cross-section view of the dialyzer 501, and a side view of the press-fit connector 502 and a cross-section view of a short section of the water pipe 503. The dialyzer 501 includes a dialyzer port 504, around which the press-fit connector 502 fits, and the press-fit connector fits into a hole in the water pipe 503.

FIG. 5B depicts just a section of the water pipe 503, in a cross-section view.

Figure 5C:
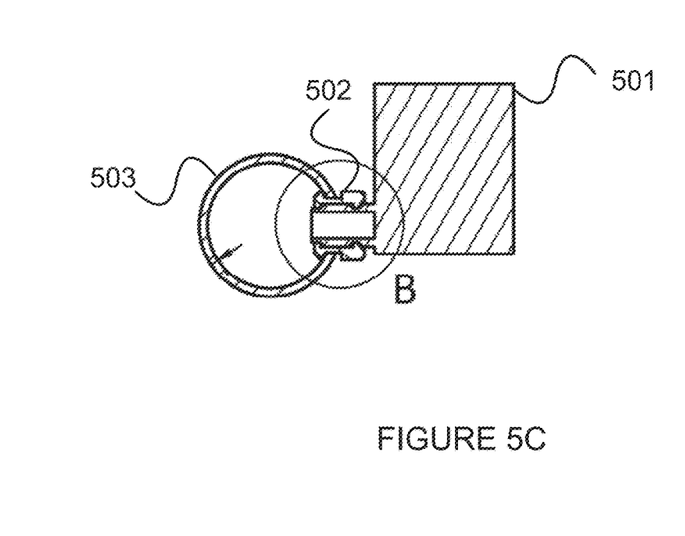

FIG. 5C is a cross-section illustration of the plane marked as line 'A' in FIG. 5B.

FIG. 5C depicts the dialyzer 501, the press-fit connector 502 and the water pipe 503.

Figure 5D:
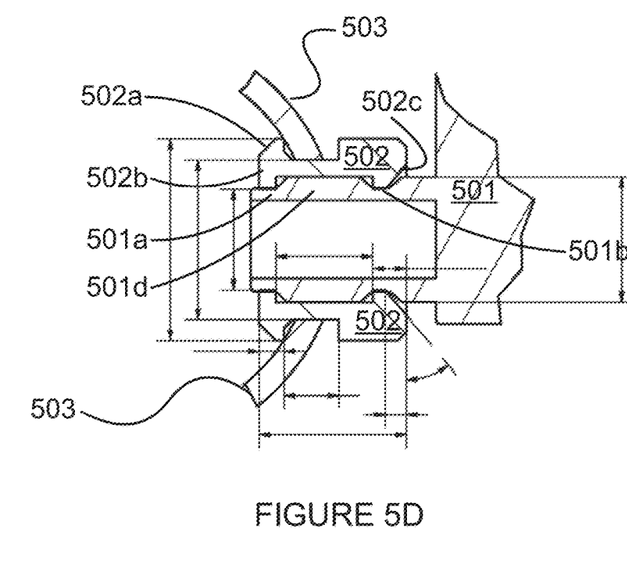

FIG. 5C includes a drawing of a circle 'B', which delineates a section of FIG. 5C which is presented enlarged in FIG. 5D.

FIG. 5D depicts details in the dialyzer 501, the press-fit connector 502 and the water pipe 503 in an enlarged drawing.

FIG. 5D depicts some details of a structure of a dialysate port 501d of the dialyzer 501: a taper 501a at an open end of the dialysate port 501d and a cutout 501b around a circumference of the dialysate port 501d.

FIG. 5D depicts some details of a structure of press-fit connector 502: a tapered portion 502a at a first end of the press-fit connector 502, a flange 502b at the first end of the press-fit connector 502 and a flange 502c at a second end of the press-fit connector 502.

The flange 502b is optionally shaped to envelop the dialysate port 501d.

The flange 502c is optionally shaped to envelop the cutout 501b around the circumference of the dialysate port 501d.

In some embodiments a distance between the flange 502b and the flange 502c of the press-fit connector 502 is approximately equal or exactly equal to a distance between the taper 501a and the cutout 501b of the dialysate port 501d.

FIGS. 5A-5D depict an embodiment where the tip of the dialyzer port 501d, that is the taper 501a and part of the body of the dialyzer port 501d being actually inside the water pipe 503, while above-referenced FIGS. 3 and 4 depicts a dialyzer port outside the water pipe, connected to the water pipe by the connector.

Cleaning a Dialyzer by Backwashing

Water filters are sometimes cleaned by backwashing, that is, providing plenty of clean water flowing through the water filter in reverse, so as to wash out and clean a clogged water filter. However, a typical prior art water filter requires plenty of water to unclog or clean by backwashing, and the clean water of several water filters is required for backwashing a single prior art water filter, or the clean water of a large number of water filters is required for backwashing a smaller number of prior art water filters.

A dialyzer used as a water filter may also become dirty, less efficient, or even clogged.

In some embodiments of the invention, clean water from an output of a first dialyzer may be directed to an output of a second dialyzer, and flow in a reverse direction, backwash, through the second dialyzer. Such a reverse flow potentially cleans the second dialyzer. The clean water from the first dialyzer flows into the clean side of the second dialyzer, and unclean water flows back through the unclean side of the second dialyzer.

Capillary membranes of dialyzers, being designed for blood flow on an inside of the capillary membranes, are especially smooth, resist fouling, and are easier to clean than typical ultra-filtration filters.

In some embodiments of the invention, a single dialyzer is sufficient to provide clean water to clean another single dialyzer by backwashing.

In some embodiments, a first group of dialyzers, being made of especially smooth capillary membranes, may optionally be cleaned with a flow of clean water from a second group of dialyzers, with the number of dialyzers in the first group not lesser than the number of dialyzers in the second group.

In some embodiments, dialyzers, being made of especially smooth capillary membranes, may optionally be cleaned with a flow of clean water from one or more dialyzers possessing a total membrane area equal or even lesser than a total membrane area of the dialyzers being cleaned.

Figure 6A:
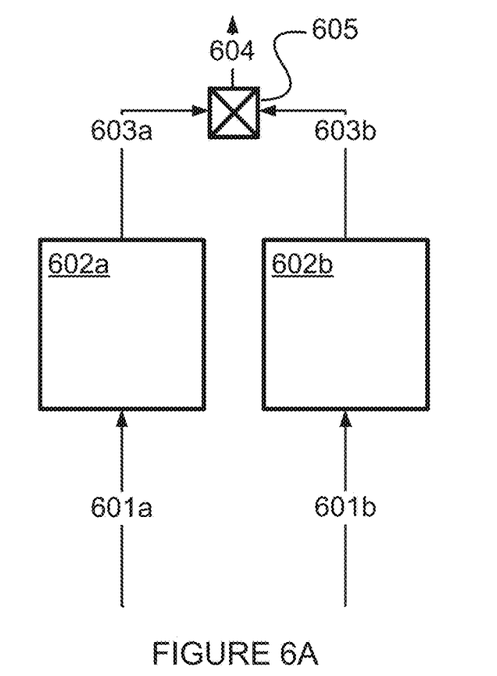
FIG. 6A is a simplified line drawing illustration of a flow path of clean water from an output of a first dialyzer and a second dialyzer, both dialyzers used to filter water according to an example embodiment of the invention.

Reference is now made to FIG. 6A, which is a simplified line drawing illustration of a flow path of clean water from an output of a first dialyzer and a second dialyzer, both dialyzers used to filter water according to an example embodiment of the invention.

FIG. 6A depicts an example embodiment for filtering water. Water inputs 601a 601b provide water to dialyzers 602a 602b, and the dialyzers 602a 602b filter the water, producing outputs 603a 603b of filtered water. The outputs 603a 603b may provide filtered water separately, as separate outputs 603a 603b, and, in some embodiments the outputs 603a 603b may connect to a single output 604. In some embodiments the outputs 603a 603b may connect to the single output 604 via a valve 605.

It is noted that when a dialyzer is used as a water filter, in some example embodiments of the invention one dialyzer port may be used for water input, and in some example embodiments of the invention two dialyzer ports may be used for water input.

It is noted that when a dialyzer is used as a water filter, in some example embodiments of the invention one dialyzer port may be used for water output, and in some example embodiments of the invention two dialyzer ports may be used for water output.

Figure 6B:
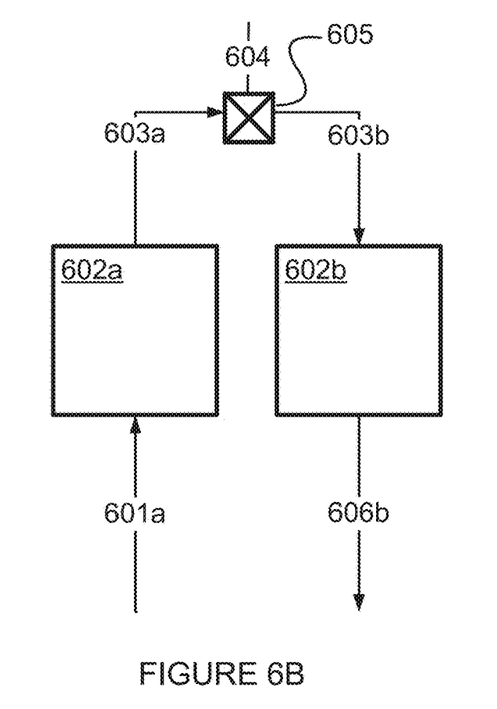
FIG. 6B is a simplified line drawing illustration of a flow path of clean water from an output of a first dialyzer used to clean a second dialyzer by backwashing according to an example embodiment of the invention.

Reference is now made to FIG. 6B, which is a simplified line drawing illustration of a flow path of clean water from an output of a first dialyzer used to clean a second dialyzer by backwashing according to an example embodiment of the invention.

FIG. 6B depicts an example embodiment for cleaning the second dialyzer by backwashing with clean water from the first dialyzer. A water input 601a provides water to a first dialyzer 602a, the dialyzer 602a filters the water, producing output 603a of filtered water. The filtered water is fed via a valve 605 to output 603b of a second dialyzer 602b, and flows through the second dialyzer 602b, backwashing and cleaning the second dialyzer 602b, exiting from the second dialyzer 602b via the water input 606b.

It is noted that in some embodiments no water flows out from the output 604 when the first dialyzer 602a is being used to backwash the second dialyzer 602b.

It is noted that when a first dialyzer is being cleaned by backwash, in some example embodiments of the invention one dialyzer port may be used for water input, and in some example embodiments of the invention two dialyzer ports may be used for water input.

It is noted that when a dialyzer is being cleaned by backwash, in some example embodiments of the invention one dialyzer port may be used for water output, and in some example embodiments of the invention two dialyzer ports may be used for water output.

In some embodiments of the invention, in a water filtration system comprising dialyzers for water filtration, a method of cleaning a dialyzer includes providing clean water from a clean water output of one first dialyzer to a clean water output of one second dialyzer, to backwash the second dialyzer.

In some embodiments of the invention the providing clean water from a clean water output includes providing clean water from a clean water output of first group of dialyzers to a clean water output of a second group of dialyzers, to backwash the second group of dialyzers.

In some embodiments the number of dialyzers in the first group of dialyzers is not greater than the number of dialyzers in the second group of dialyzers.

Figure 7A:
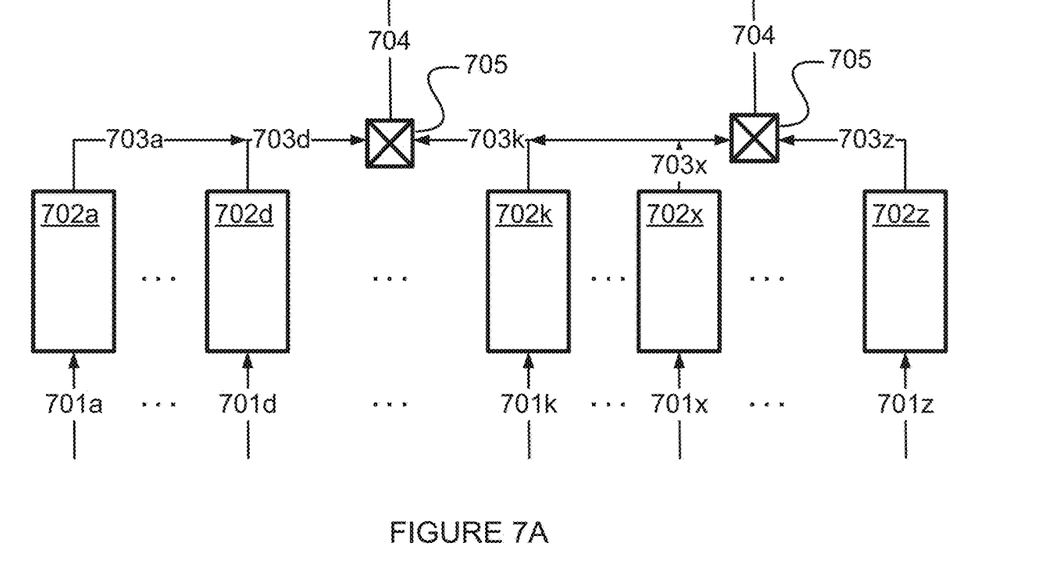
FIG. 7A is a simplified line drawing illustration of a flow path of clean water from an output of several dialyzers, the dialyzers used to filter water according to an example embodiment of the invention.

Reference is now made to FIG. 7A, which is a simplified line drawing illustration of a flow path of clean water from an output of several dialyzers, the dialyzers used to filter water according to an example embodiment of the invention.

FIG. 7A depicts an example embodiment for filtering water. Water inputs $701a$ . . . $701d$ . . . $701k$ . . . $701x$ . . . $701z$ provide water to dialyzers $702a$ . . . $702d$ . . . $702k$ . . . $702x$ . . . $702z$, and the dialyzers $702a$ . . . $702d$ . . . $702k$ . . . $702x$ . . . $702z$ filter the water, producing outputs $703a$ . . . $703d$ . . . $703k$ . . . $703x$ . . . $703z$ of filtered water. The outputs $703a$ . . . $703d$ . . . $703k$ . . . $703x$ . . . $703z$ may provide filtered water separately, as separate outputs $703a$ . . . $703d$ . . . $703k$ . . . $703x$ . . . $703z$, and, in some embodiments the outputs $703a$ . . . $703d$ . . . $703k$ . . . $703x$ . . . $703z$ may connect to one or more output(s) 704. In some embodiments the outputs $703a$ . . . $703d$ . . . $703k$ . . . $703x$ . . . $703z$ may connect to the one or more output(s) 704 via one or more valve(s) 705.

Figure 7B:
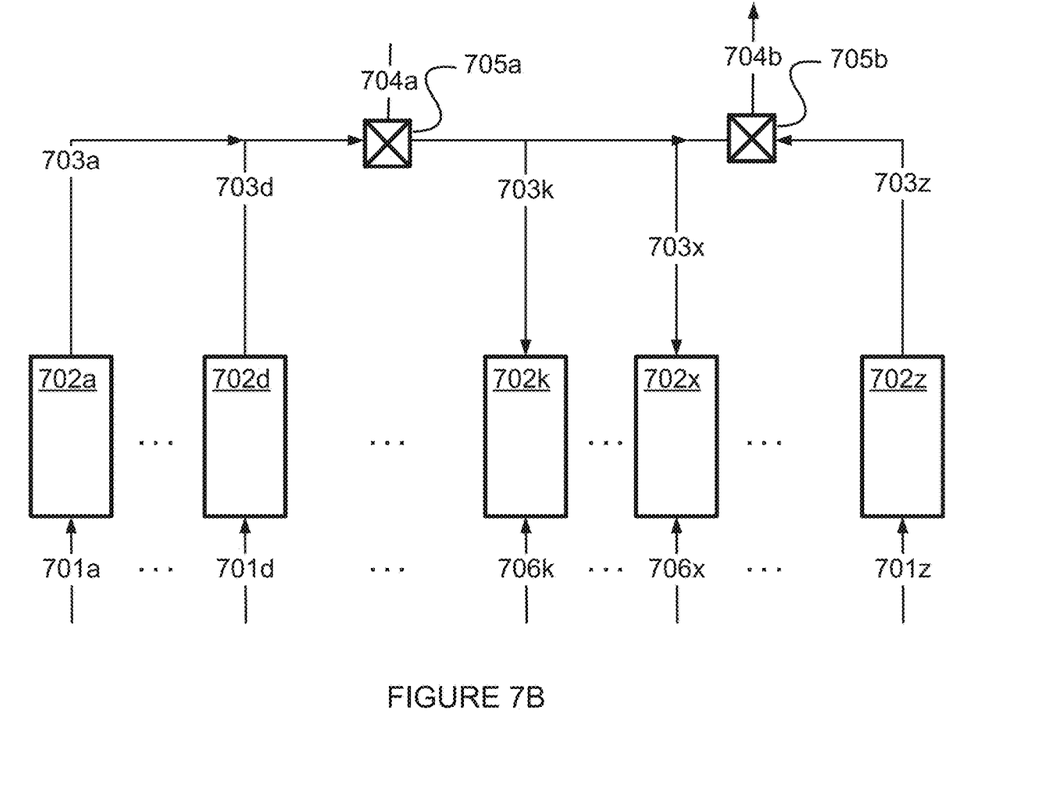
FIG. 7B is a simplified line drawing illustration of a flow path of clean water from an output of a first group of dialyzers used to clean a second group of dialyzers by backwashing, according to an example embodiment of the invention.

Reference is now made to FIG. 7B, which is a simplified line drawing illustration of a flow path of clean water from an output of a first group of dialyzers used to clean a second group of dialyzers by backwashing, according to an example embodiment of the invention.

FIG. 7B depicts an example embodiment for cleaning the second group of dialyzers by backwashing with clean water from the first group of dialyzers. Water inputs $701a$ . . . $701d$ provide water to a first group of dialyzer $702a$ . . . $702d$, the first group of dialyzers $702a$ . . . $702d$ filter the water, producing outputs $703a$ . . . $703d$ of filtered water. The filtered water is fed via a valve $705a$ to outputs $703k$ . . . $703x$ of a second group of dialyzers $702k$ . . . $702x$, and flows through the second group of dialyzers $702k$ . . . $702x$, backwashing and cleaning the second group of dialyzer $702k$ . . . $702x$, exiting from the second group of dialyzers $702k$ . . . $702x$ via the water inputs $706k$ . . . $706x$. It is noted that in some embodiments no water flows out from an output $704a$ when the first group of dialyzers $702a$ . . . $702d$ are being used to backwash the second group of dialyzer $702k$ . . . $702x$.

It is noted that in some embodiments water may flow out from a third group of dialyzers $702z$, optionally through the same valve $704a$, or through a different $704b$, when the first group of dialyzers $702a$ . . . $702d$ is being used to backwash the second group of dialyzers $702k$ . . . $702x$.

Figure 8:
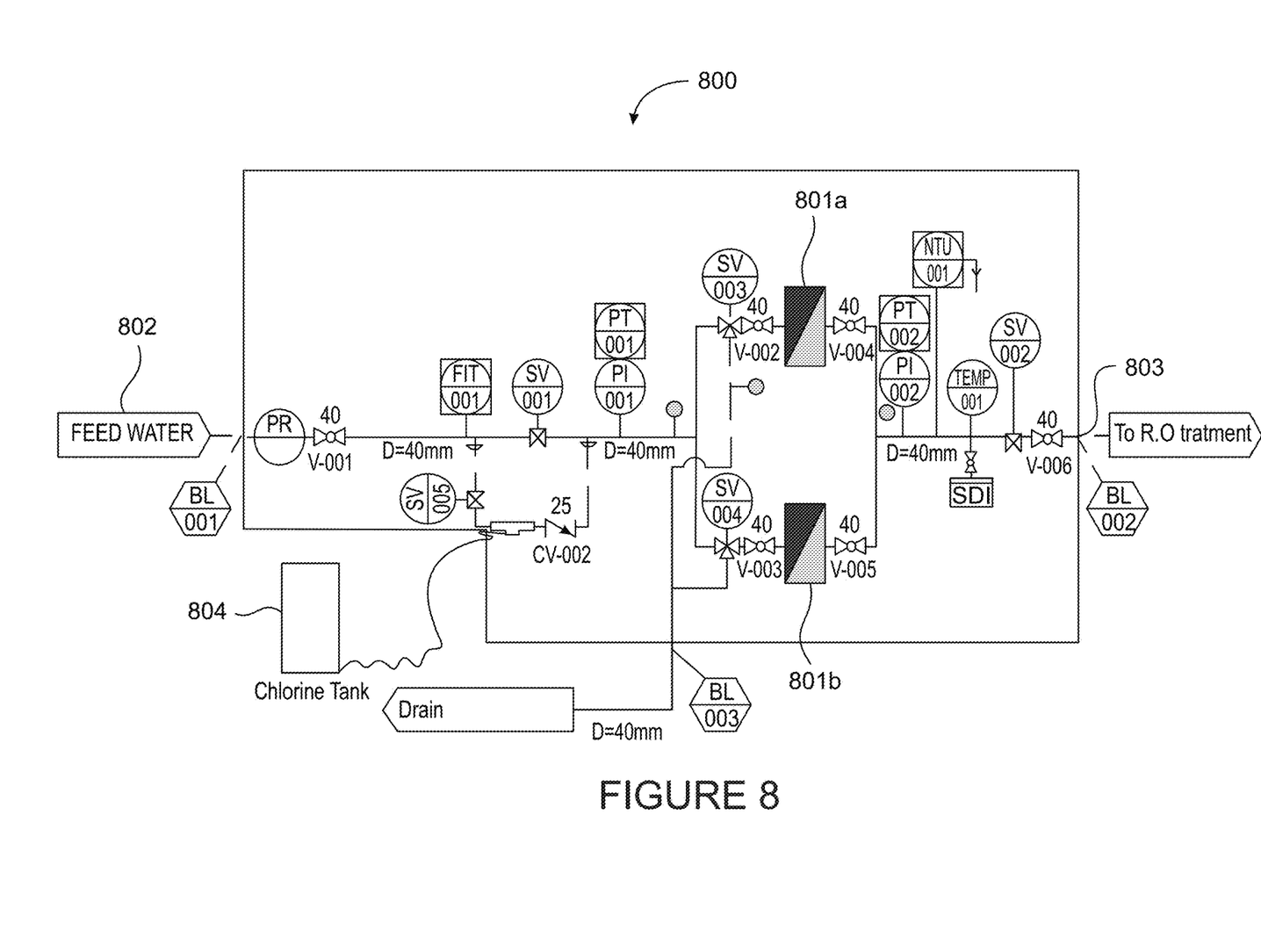
FIG. 8 is a simplified diagrammatical illustration of a water filtration unit according to an example embodiment of the invention.

Reference is now made to FIG. 8, which is a simplified diagrammatical illustration of a water filtration unit according to an example embodiment of the invention.

FIG. 8 depicts a water filtration unit 800, which includes two dialyzer modules $801a$ $801b$, each of which includes 40 dialyzers. Backwashing of one of the dialyzer modules $801a$ $801b$ happens from time to time using clean water produced by another one of the dialyzer modules $801a$ $801b$.

A simplified description of backwashing in the water filtration unit 800 is provided below.

Water is provided at a water input 802. In some embodiments the water is provided at a pressure of 3 atmospheres, although a range of pressures of 0.2-10 atmospheres is optionally contemplated.

In some embodiments a pressure pump (not shown) is included as part of the water filtration unit 800 to provide water pressure to water being input at the water input 802.

In some embodiment the water provided at the water input 802 is provided at a rate of 43 cubic meters per hour, although a range of water provision rates of 0.5-10,000 cubic meters per hour is optionally contemplated.

The water supplied is filtered through the dialyzer modules $801a$ $801b$.

In some embodiments the dialyzer modules $801a$ $801b$ operate in a dead-end configuration, where the water provided at the water input 802 does not exit the dialyzer modules $801a$ $801b$.

Filtered water is optionally provided to a water output 803.

In some embodiments the water output 803 optionally supplies the filtered water to a reverse osmosis unit (not shown), as the degree of filtration is potentially good enough to supply a reverse osmosis unit, for example for desalinization, without additional filtering.

In some embodiments the water is also optionally chlorinated by a chlorination tank 804. In some embodiments the chlorinated water is optionally neutralized by a SMBS dosing unit (not shown).

In some embodiments the SMBS dosing unit (not shown) is optionally controlled by a Redox controller (not shown).

In some embodiments the water filtration unit 800 includes 2 skids, each skid with 3 modules of 80 dialyzers.

In some embodiments a backwash operation of 60 seconds, where a skid provides filtered water to another skid for backwashing, is performed once every 2 hours.

In some embodiments a first skid filters water and provides the filtered water for backwashing a second skid. Later, the second skid filters water and provides the filtered water for backwashing the first skid.

In some embodiments the frequency and duration of backwashing is optionally variable, determined by physical and/or microbiological load in the input water. In some embodiments the frequency of backwashing may optionally be selected between once every 5 minutes and up to once a week. In some embodiments a typical backwash time may vary from 30 seconds up to 10 minutes.

In some embodiments, the backwashing is initiated automatically, by way of a non-limiting example by sensing water pressure at an input of a dialyzer of group of dialyzers, and/or by sensing a water pressure differential between input and output of a dialyzer or group of dialyzers.

In some embodiments backwash is manually ended by an operator seeing that backwash water is clear.

In some embodiments backwash is automatically ended by a sensor providing an ending signal when the backwash water clarity is above a specific value, and/or the backwater opacity is below a specific value.

In some embodiments the backwash operates without providing additional pressure for backwash water.

In some embodiments the backwash operates without providing a vessel for collecting clean water for backwashing, based on providing clean water for backwashing from one or more dialyzers or dialyzer groups operating under water pressure and/or water flow rate similar or equal to water pressure and/or flow rate used for filtering water for non-backwash purposes.

In some embodiments the backwash operates with a pressure booster pump which maintains a desired backwash pressure, without a vessel for collecting clean water for the backwashing. In some embodiments the pressure booster operates to add pressure, and a pressure relief valve optionally relieves pressure.

In some embodiments backwash water is optionally provided at a range of pressures between 0.4 and 6 bars.

The above features of operating backwash optionally without a water pressure pump for backwash use, and/or without a vessel for collecting clean water for backwash potentially provides an advantage over typical ultra-filtration units which require such a vessel or pressure supply for performing backwash.

The above features of operating backwash optionally without a water without a vessel for collecting clean water for backwash potentially provides an advantage over typical ultra-filtration units which do use such a collection vessel, and then need to chlorinate water in the collection vessel, since it is standing water during all non-backwash periods.

In some embodiments chlorinated water is optionally used for backing, thereby providing Chemically Enhanced Backwash.

It is expected that during the life of a patent maturing from this application many relevant dialyzers will be developed and the scope of the term dialyzer is intended to include all such new technologies a priori.

As used herein the term "approximately" refer to ±25%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of cleaning a dialyzer in a system for water filtration, comprising:
    providing a water filtration system comprising:
        a first set of dialyzers, with one or more dialyzers and having a water input and
        a clean water output; and
        a second set of dialyzers, with one or more dialyzers and having a water input
        and a clean water output;
    providing water to the water input of said first set of dialyzers and receiving clean water from said clean water output of the first set of dialyzers;
    providing said clean water to said clean water output of the second set of dialyzers;
    backwashing the second set of dialyzers with said clean water;

switching from time to time from backwashing the second set of dialyzers using clean water from the clean water output of the first set of dialyzers to backwashing the first set of dialyzers using clean water from the clean water output of the second set of dialyzers;

wherein a number of dialyzers in the first set of dialyzers is not greater than a number of dialyzers in the second set of dialyzers.

2. The method of claim 1, wherein a total membrane area of the first set of dialyzers is not greater than a total membrane area of the second set of dialyzers.

3. A system for water filtration comprising:
at least one dialyzer;
a water input pipe connected to a blood port of the dialyzer;
a first reversible press-fit connector; and
a clean water output pipe,
wherein:
the first press-fit connector comprises a body including a cavity crossing the body from a first end of the body to a second end of the body, for enabling water flow from the first end to the second end;
the cavity at the first end of the body is shaped and sized for pressing onto and encircling a port of the dialyzer;
the cavity at the second end of the connector body is shaped and sized for pressing into a hole in a side wall of a water pipe; and
a dialysate port of the dialyzer is connected to a hole in a side wall of the clean water output pipe by the first press-fit connector.

4. The system of claim 3 wherein the clean water output pipe is directly connected by two press-fit connectors to both dialysate ports of the dialyzer.

5. The system of claim 3, wherein the first press-fit connector is shaped to connect the dialysate port of the dialyzer to the hole in a side wall of the clean water output pipe so that a tip of the dialysate port of the dialyzer is inside the hole in the side wall of the clean water output pipe.

6. The system of claim 3, wherein the first press-fit connector is shaped to connect the dialysate port of the dialyzer to the hole in a side wall of the clean water output pipe so that a distance between a tip of the dialysate port of the dialyzer and the side wall of the clean water output pipe is not greater than 5 millimeters.

7. The system of claim 3, wherein the first press-fit connector comprises an internal surface at least partly shaped to conform to an outer surface of the dialysate port of the dialyzer.

8. The system of claim 7, wherein the internal surface of the first press-fit connector conforms to an outer surface of the dialysate port of the dialyzer by including a groove conforming to a shape of a nipple of the dialysate port of the dialyzer.

9. The system of claim 3, wherein the first press-fit connector comprises an outer surface comprising:
a first tapered end; and
following the first tapered end a cutout around the first press-fit connector, at least as wide as a wall of the clean water output pipe.

10. The system of claim 3, wherein the water input pipe is connected to the blood port of the dialyzer by at least one second press-fit connector.

11. The system of claim 10, wherein the second press-fit connector comprises an outer surface comprising:
a first tapered end; and
following the first tapered end a cutout around the second press-fit connector, at least as wide as a wall of the clean water output pipe.

12. The system of claim 3, and further comprising:
a second dialyzer; and
at least one valve enabling connection of clean output water from the first dialyzer to a dialysate port of the second dialyzer, to backwash the second dialyzer.

13. A method for filtering water comprising:
providing a system for water filtration comprising:
at least one dialyzer;
a water input pipe connected to a blood port of the dialyzer;
a first reversible press-fit connector; and
a clean water output pipe;
wherein:
the first press-fit connector comprises a body including a cavity crossing the body from a first end of the body to a second end of the body, for enabling water flow from the first end to the second end;
the cavity at the first end of the body is shaped and sized for pressing onto and encircling a port of the dialyzer;
the cavity at the second end of the connector body is shaped and sized for pressing into a hole in a side wall of a water pipe;
a dialysate port of the dialyzer is connected to a hole in a side wall of the clean water output pipe by the first press-fit connector;
providing water to the water input pipe; and
withdrawing clean water from the clean water output pipe.

14. The method of claim 13, wherein the clean water output pipe is connected by two press-fit connectors to both dialysate ports of the dialyzer.

15. The method of claim 13, wherein the first press-fit connector is shaped to connect the dialysate port of the dialyzer to a hole in a side wall of the clean water output pipe so that a tip of the dialysate port of the dialyzer is inside the hole in the side wall of the clean water output pipe.

16. The method of claim 13, wherein the first press-fit connector comprises an internal surface at least partly shaped to conform to an outer surface of the dialysate port of the dialyzer.

17. The method of claim 13, wherein the water input pipe is connected to the blood port of the dialyzer by at least one second press-fit connector.

18. The method of claim 1, wherein the dialyzers are made of capillary membranes which are smooth relative to industrial filters.

19. The method of claim 1, wherein the water filtration system does not include a vessel for collecting clean water from the clean water output of the first set of dialyzers for backwashing.

20. The system of claim 3 wherein the press-fit connector seals said port of the dialyzer without o-rings; and
said sealing withstands pressure, from 0.2 bar up to 10 bars.

* * * * *